(12) United States Patent
Noda et al.

(10) Patent No.: US 6,299,927 B1
(45) Date of Patent: Oct. 9, 2001

(54) SEASONING, TEXTURE IMPROVER AND DRIP INHIBITOR

(76) Inventors: Minoru Noda, 1-14-12, Shintomi-cho, Kashiwa, Chiba; Fumio Noda, c/o Sugiyo Co., Ltd., 27-1, Ingai, Fuchumachi, Nanao, Ishikawa; Tetsuya Sugino; Yoshito Sugino, both of Sugiyo Co., Ltd., 27-1, Ingai, Fuchumachi, Nanao, Ishikawa; Mitsuo Takahashi, c/o Sugiyo Co., Ltd., 27-1, Ingai, Fuchumachi, Nanao, Ishikawa, all of (JP)

( * ) Notice: Subject to any disclaimer, the term of this patent is extended or adjusted under 35 U.S.C. 154(b) by 0 days.

(21) Appl. No.: 09/444,509

(22) Filed: Nov. 22, 1999

(30) Foreign Application Priority Data

Nov. 24, 1998 (JP) ................................................. 10-332999

(51) Int. Cl.$^7$ .............................. A23L 1/238; A23L 1/221
(52) U.S. Cl. ........................... 426/650; 426/634; 426/638
(58) Field of Search ..................... 426/650, 652, 426/634, 638, 46, 589

(56) References Cited

FOREIGN PATENT DOCUMENTS

| 0 857 428 | 8/1998 | (EP) . |
| 60-256362 | * 12/1985 | (JP) . |
| 01 023870 | 1/1989 | (JP) . |
| 01 132354 | 5/1989 | (JP) . |

OTHER PUBLICATIONS

Kim et al., *J. Japanese Soc. Food & Nutrit.*, 24(1): 46–49, English Abstract only, Jan. 1971.*

Hashimoto et al, *J. Fermentation Tech.*, 50(4):257–263, English Abstract only, Jan. 1972.*

Katagiri et al., *Nippon Nogeikagaku Kaishi,* 60(5): 385–388. English Abstract only, Jan. 1986.*

Steinkraus, K. *Indigenous Fermented Foods,* 2nd edition, p. 349–350, Jan. 1996.*

* cited by examiner

*Primary Examiner*—Keith Hendricks
(74) *Attorney, Agent, or Firm*—Banner & Witcoff, Ltd.

(57) ABSTRACT

A seasoning selected from the group consisting of soy sauce, miso (fermented salty soybean paste), mirin (sweet sake) sauce and sweetener, characterized in that it is alkaline. The present invention is useful as a texture improver for food materials containing fibrous protein as a major component and a drip inhibitor for food materials containing fibrous protein as a major component.

7 Claims, No Drawings

SEASONING, TEXTURE IMPROVER AND DRIP INHIBITOR

BACKGROUND OF THE INVENTION

1. Field of the Invention

The present invention relates to a seasoning which is alkaline.

2. Background Art

As is well known, soy sauce, miso (fermented salty soybean paste), mirin (sweet sake), sauce and sweetener are acid having a pH of 4 to 6, and used as a cooking material to synthetically control the taste of food.

The prior seasonings above described control the taste of food mainly. In other words, they are used to season food materials, but not have the effect to improve the texture of cooked food which is a feeling experienced when the food is put in the mouth.

Recently, enzymatically modified seasonings to improve the texture of food as the main purpose have been developed. However, in case that an enzymatically modified seasoning is used, there is a problem that the prior seasoning above described must be also used.

Furthermore, in case that food materials containing fibrous protein as a main component are cooked, the essential nutrient components of the food materials are lost because dripping occurs in the thawing process or the heating process.

SUMMARY OF THE INVENTION

As a result of effortful studies and experiments in order to solve the technical problems and obtain a seasoning that can season food materials containing fibrous protein as a major component and improve the texture of the food materials and also can inhibit loss of the nutrient components of the food materials in cooking, the present inventors have found the fact that the improvement of the texture of the food materials in addition to seasoning thereof, and the inhibition of loss of the nutrient components of the food materials in cooking are realized by alkalinizing the above described seasonings, and hence the technical problems above described are solved.

The technical problems above described are solved in accordance with the present invention as follows.

The present invention provides a seasoning selected from the group consisting of soy sauce, miso, mirin, sauce and sweetener, characterized in that it is alkaline.

Also, the present invention provides a seasoning having a pH of 7.6 to 9.3.

Furthermore, the present invention provides a texture improver for food materials containing fibrous protein as a major component, characterized in that it comprises one of the seasonings above described and a drip inhibitor for food materials containing fibrous protein as a major component, characterized in that it comprises one of the seasonings above described.

DETAILED DESCRIPTION OF THE INVENTION

Some preferred embodiments of the present invention are explained as follows.

The alkaline seasoning according to the present invention may be prepared by addition of an alkaline substance to soy sauce, miso, mirin, sauce or sweetener in the process for producing these seasonings or by addition of an alkaline substance to prepared soy sauce, miso, mirin, sauce or sweetener. The preferable pH of the seasoning is 7.6 to 9.3.

As the alkaline substance, there are exemplified seaweed ash, alkaline starch, sodium acetate, sodium bicarbonate, sodium carbonate, sodium hydrogen phosphate, trisodium citrate, sodium lactate, sodium malate, potassium carbonate and the like.

The seasoning according to the present invention may be in the form of liquid or powder.

By using the alkaline seasoning according to the present invention, seasoning of food and improvement of the texture therof can be realized at the same time.

Furthermore, by using the alkaline seasoning according to the present invention for cooking food materials comprising fibrous protein as a major component such as fishes and shellfishes, crustacea and meats, the texture of the food materials can be improved (refer to the following Examples 1 to 4), so that the seasoning can be used as a texture improver for food materials comprising fibrous protein as a major component.

Also, by using the alkaline seasoning according to the present invention for cooking food materials comprising fibrous protein as a major component such as fishes and shellfishes, crustacea and meats, the yield can be improved (refer to the following Examples 2 to 4) and loss of the essential nutrient components of the food materials can be inhibited (refer to the following Example 8), so that the seasoning can be used as a drip inhibitor.

EXAMPLES

Examples 1 to 4 and Comparative Examples 1 and 2

The pH was adjusted by addition of sodium carbonate to salt-reduced soy sauce (the concentration of common salt 8.2%, pH 5.0) to obtain a seasoning having pH 7.0 (Comparative Example 1), a seasoning having pH 7.6 (Example 1), a seasoning having pH 8.0 (Example 2), a seasoning having pH 9.0 (Example 3), a seasoning having pH 9.3 (Example 4) and a seasoning having pH 9.5 (Comparative Example 2).

Then, 6 bowls were prepared. One hundred (100) cc of each one of the 6 seasonings above described was put into the bowls respectively and a split horse mackerel having 25 cm of length was put into each bowl to season them by immersing them for 30 minutes. Then, the split horse mackerels were taken out from the bowls, and dried by cold air at 20° C. for 2 hours to obtain 6 dried split horse mackerels. Then, the 6 dried horse mackerels were broiled in a Schbank broiler for 5 minutes on each of the front and the back.

A sensory test on the dried and broiled horse mackerels was carried out by 20 panelists (8 adult males and 12 adult females) to judge the superiority or inferiority of the flavor and the juicy taste. The results are shown in Table 1.

The yield (V) was calculated by the expression: $V=$(the weight before the immersing (Wo)/the weight after the broiling (Ws))$\times 100$.

TABLE 1

| | pH | Evaluation of Flavor | Juicy Taste | V(%) |
| --- | --- | --- | --- | --- |
| Comp. Example 1 | 7.0 | + | − | 69.3 |
| Example 1 | 7.6 | ++ | + | 80.1 |

TABLE 1-continued

|  | pH | Evaluation of Flavor | Juicy Taste | V(%) |
|---|---|---|---|---|
| Example 2 | 8.0 | ++ | + | 82.2 |
| Example 3 | 9.0 | + | ++ | 85.3 |
| Example 4 | 9.3 | + | ++ | 80.6 |
| Comp. Example 2 | 9.5 | − | + | 78.2 |

(−: inferior, +: good, ++: superior)

The products seasoned by each one of the seasonings having pH 7.6 to 9.3 of Examples 1 to 4 were evaluated as being superior in both flavor and juicy taste. Also, they had superior values of the yield (V).

Example 5 and Comparative Example 3

The pH was adjusted by addition of sodium carbonate to salt-reduced soy sauce (the concentration of common salt 8.2%, the concentration of nitrogen 1.6%) to obtain a seasoning having pH 8.0 (Example 5). Also, salt-reduced soy sauce having not adjusted pH but having pH 4.8 (the concentration of common salt 8.2%, the concentration of nitrogen 1.6%) was prepared (Comparative Example 3).

Two pots were prepared. Five liters of the salt-reduced soy sauce seasoning above described was poured into one of the pots, and 5 liters of the salt-reduced soy sauce having not adjusted pH was poured into the other pot. Twenty kilograms of dice-shaped beef blocks having 20 mm of each side length were prepared and separated in each 10 kg of the beef blocks. Each 10 kg of the beef blocks was put into the above described pots respectively and immersed at 5° C. for 2 hours. Next, a liquid seasoning comprising 50 g of gingerroot, 1.2 kg of sugar, 1 kg of starch syrup, 10 g of agar, 20 g of sodium glutamate and 3 liters of normal soy sauce (called as koikuchi soy sauce) was poured into each pot and boiled for 1 hour to obtain boiled beef blocks.

By weighing the boiled beef blocks without the broth, it was confirmed that the boiled beef blocks seasoned by the salt-reduced soy sauce seasoning was 9.5 kg, while the boiled beef blocks seasoned by the salt-reduced soy sauce having not adjusted pH was 8.0 kg, so that the yield was improved.

A sensory test on the boiled beef blocks above described was carried out by 20 panelists (8 adult males and 12 adult females) according to the triangle discrimination-taste test. All panelists discriminated, and 19 panelists (7 adult males and 12 adult females) evaluated that the boiled beef blocks seasoned by the salt-reduced soy sauce seasoning were more juicy and had soft texture and were superior.

Example 6 and Comparative Example 4

The pH was adjusted by addition of trisodium citrate to mirin (Baume 19 degrees, alcohol 13.5%, sugar 37%) to obtain a mirin seasoning having pH 8.0 (Example 6). Also, mirin having not adjusted pH, but having pH 5.4 (Baume 19 degrees, alcohol 13.5%, sugar 37%) was prepared (Comparative Example 4).

Two pots were prepared. Two liters of the mirin seasoning above described was poured into one of the pots, and 2 liters of the mirin having not adjusted pH was poured into the other pot. Twenty kilograms of dice-shaped tuna blocks having 10 mm of each side length were prepared and separated in each 10 kg of the tuna blocks. Each 10 kg of the tuna blocks was put into the above described pots respectively and immersed at 5° C. for 15 hours. Next, a seasoning comprising 50 g of gingerroot, 20 g of sodium glutamate and 3 liters of normal soy sauce were poured into each pot and boiled with medium heat for 2 hours to obtain boiled tuna blocks.

By weighing the boiled tuna blocks without the broth, it was confirmed that the boiled tuna blocks seasoned by the mirin seasoning was 9 kg, while the boiled tuna blocks seasoned by the mirin having not adjusted pH was 8.0 kg, so that the yield was improved.

A sensory test on the boiled tuna blocks above described was carried out by 20 panelists (8 adult males and 12 adult females) according to the triangle discrimination-taste test. All panelists discriminated, and 18 panelists (6 adult males and 12 adult females) evaluated that the boiled tuna blocks seasoned by the mirin seasoning were more juicy and had soft texture and were superior.

Example 7 and Comparative Example 5

The pH was adjusted by addition of sodium malate to a sauce for broiled meat (the concentration of common salt 1.2%, the concentration of nitrogen 1.0%) to obtain a sauce seasoning for broiled meat having pH 7.8 (Example 7). Also, a sauce for broiled meat having not adjusted pH, but having pH 5.1 (the concentration of common salt 1.2%, the concentration of nitrogen 1.0%) was prepared (Comparative Example 5).

Two bowls were prepared. 500 cc of the sauce seasoning for broiled meat above described was poured into one bowl, and 500 cc of the sauce for broiled meat having not adjusted pH was poured into the other bowl. Next, 40 oval-shaped pieces of beef having 100 g of weight and 15 mm of thickness were prepared and separated in each 20 pieces. Each 20 pieces of beef were put into the bowls respectively and immersed at room temperature for 1 hour. Then, the beef pieces were taken out from the bowls, and broiled on an iron plate at 140° C. for 5 minutes on each of the upper and under surface thereof.

By weighing the broiled oval-shaped beef pieces, it was confirmed that the average weight of the oval-shaped pieces seasoned by the sauce seasoning for broiled meat was 90 g, while that of the oval-shaped pieces seasoned by the sauce for broiled meat having not adjusted pH was 80 g.

A sensory test on the broiled oval-shaped pieces of beef was carried out by 20 panelists (8 adult males and 12 adult females) according to the pair test. 16 panelists (6 adult males and 10 adult females) evaluated that the oval-shaped pieces of beef seasoned by the sauce seasoning for broiled meat were more juicy and had soft texture and were superior as a whole.

Example 8 and Comparative Example 6

The pH was adjusted by addition of sodium lactate to salt mirin (the concentration of common salt 2.0%, alcohol 10.5%) to obtain a salt mirin seasoning having pH 7.6 (Example 8). Also, salt mirin having not adjusted pH but having pH 4.8 (the concentration of common salt 2.0%, alcohol 10.5%) was prepared (Comparative Example 6).

Fresh flying fishes immediately after they were caught had the heads and viscera thereof removed and were subjected to a fish meat separater (with a tooth of 0.3 mm) to obtain 20 kg of otoshimi (chopped fish meat) of flying fish. The otoshimi of flying fish obtained was divided into 2 parts. To one part of 10 kg of the otoshimi, 0.3 kg of common salt, 0.5 kg of sugar, 1 kg of starch, 0.5 kg of the salt mirin seasoning above described and 2 kg of ice water were added and mixed. The seasoned fish meat was ground by a silent cutter for 5 minutes to prepare ground fish meat seasoned by the salt mirin seasoning.

To the remaining 10 kg of the otoshimi, 0.3 kg of common salt, 0.5 kg of sugar, 1 kg of starch, 0.5 kg of salt mirin having not adjusted pH and 2 kg of ice water were added and mixed. In the same manner as above described, the seasoned fish meat was ground by a silent cutter for 5 minutes to prepare ground fish meat seasoned by the salt mirin having not adjusted pH.

The water holding capacity of each ground fish meat above described was measured after the heating-process and the thawing process as described below. The results are shown in Table 2.

The water holding capacity of the heated fish meat was expressed in % by heating the ground fish meat, weighing the ground fish meat before and after the heating process and dividing the weight thereof after the heating process by the weight thereof before the heating process. The heating process was carried out by molding the ground fish meat in a mold having 10 mm of thickness and 100 mm of diameter and heating the molded fish meat on a teflon-coated iron pan heated at 140° C. for total 10 minutes, 5 minutes on each of the upper and under surfaces thereof. The water-holding capacity of the thawing-processed fish meat was also expressed in % by molding the fish meat in the same manner, keeping it at -20° C. for 30 days, thawing it at 5° C., weighing it before and after the thawing process and dividing the weight thereof after the thawing process by the weight thereof before the thawing process.

TABLE 2

| | | Water Holding Capacity (%) | |
| --- | --- | --- | --- |
| | pH | After the heating process | After the thawing process |
| Example 8 | 7.6 | 94.0 | 97.3 |
| Comp. Example 6 | 4.8 | 60.9 | 69.8 |

Next, the content of taurin which is noteworthy as a nutrient component of fish and shellfish was measured on the heat-processed fish meat and the thawing-processed fish meat which were subjected to the measurement of the water holding capacity. Concerning the heat-processed fish meat, the content of taurin of the ground fish meat seasoned by the salt mirin seasoning was 98 mg /100 g, while the content of taurin of the ground fish meat seasoned by the salt mirin having not adjusted pH was 59 mg /100 g. Concerning the thawing-processed fish meat, the contents of taurin were 100 mg 100 g and 65 mg/100 g, respectively. Therefore, it was confirmed that the yield of the nutrient component was improved.

A sensory test on the heat-processed fish meat was carried out by 20 panelists (8 adult males and 12 adult females) according to the triangle discrimination-taste test. All panelists discriminated and evaluated that the ground fish meat seasoned by the salt mirin seasoning was more juicy and had soft texture and was superior.

Next, each ground fish meat above described was filled in a tube and heated at 90° C. for 30 minutes to prepare kamaboko (boiled fish meat paste). The breaking strength, compressive distance, jelly strength and water-releasing rate were measured. The measurement results are shown in Table 3.

The breaking strength and compressive distance were measured by FUDOH KOGYO rheometer. The jelly strength was shown by the breaking strength x the compressive distance. The water-releasing rate was shown by the change rate of the weight before and after the centrifugation which was carried out at 3000 rpm for 4 minutes with an amount of an absorbent material.

TABLE 3

| | Breaking Strength (g) | Compressive Distance (cm) | Jelly Strength (g.cm) | Water-Releasing Rate (%) |
| --- | --- | --- | --- | --- |
| Example 8 | 307 | 0.80 | 245.6 | 2 |
| Comp. Example 6 | 146 | 0.50 | 73.0 | 11 |

It was confirmed that the fish paste product made of the ground fish meat seasoned by the salt mirin seasoning had an improved gel strength.

Example 9 and Comparative Example 7

A powdered soy sauce seasoning having pH 8.0 (Example 9) upon dissolution in water was obtained by mixing the powdered soy sauce (the concentration of common salt 35.1%, the concentration of nitrogen 2.8%) with seaweed ash. Also, a powdered soy sauce having not adjusted pH, but having pH 5.0 (the concentration of common salt 35.1%, the concentration of nitrogen 2.8%) upon dissolution in water was prepared (Comparative Example 7).

To 10 kg of otoshimi of salmon, 0.5 kg of sugar, 1 kg of starch, 0.6 kg of the powdered soy sauce seasoning above described and 2 kg of ice water were added and mixed. The seasoned fish meat was ground by a silent cutter for 5 minutes to prepare ground fish meat seasoned by the powdered soy sauce seasoning.

Similarly, to 10 kg of otoshimi of salmon, 0.5 kg of sugar, 1 kg of starch, 0.6 kg of the powdered soy sauce having not adjusted pH and 2 kg of ice water were added and mixed. In the same manner, the seasoned fish meat was ground by a silent cutter for 5 minutes to prepare ground fish meat seasoned by the powdered soy sauce having not adjusted pH.

Next, each ground fish meat above described was filled in a tube and heated at 90° C. for 30 minutes to prepare kamaboko. The breaking strength, compressive distance, jelly strength and water-releasing rate of the product were measured. The measurement results are shown in Table 4.

TABLE 4

| | pH | Breaking Strength (g) | Compressive Distance (cm) | Jelly Strength (g.cm) | Water-Releasing Rate (%) |
| --- | --- | --- | --- | --- | --- |
| Example 9 | 8.0 | 185 | 0.72 | 133.2 | 1 |
| Comp. Exam. 7 | 5.0 | 105 | 0.65 | 68.3 | 9 |

It has been confirmed that a good kamaboko having improved gel strength has been prepared from the ground fish meat seasoned by the powdered soy sauce seasoning.

Example 10 and Comparative Example 8

The pH was adjusted by addition of sodium carbonate to white miso to obtain a white miso seasoning having pH 8.0 (Example 10). Also, white miso having not adjusted pH, but having pH 5.2 was prepared (Comparative Example 8).

Each one of 2 split sardines having 20 cm of length was immersed in the white miso seasoning above described and the white miso having not adjusted pH at 5° C. for 2 hours respectively. Next, they were broiled in a Schbank broiler for 10 minutes. A sensory test was carried out by 20 panelists (8 adult males and 12 adult females). All panelists evaluated that the split sardine immersed in the white miso seasoning had juicy and soft texture and was superior.

The yield (V) was calculated by the weight before the immersing (Wo) and the weight after the broiling (Ws). The yield of the sardine seasoned by the white miso seasoning was 80.6%, while the yield of the sardine seasoned by the white miso having not adjusted pH was 67.7%.

As shown in Examples above described, the present invention has provided a seasoning that can not only season food materials but also improve the texture of the food materials and can inhibit loss of the essential nutrient components of the food materials when used for cooking food materials containing fibrous protein as a major component such as fishes and shellfishes, crustacea and meats.

The present invention also provides a drip inhibitor and a texture improver for food materials containing fibrous protein as a major component.

Accordingly, the industrial utility of the present invention is very high.

What is claimed is:

1. A soy sauce-, miso-, or mirin-based seasoning consisting of:
   (a) a seasoning component selected from the group consisting of soy sauce, miso, and mirin;
   (b) an alkaline component;
      wherein the pH of the seasoning is alkaline.

2. The seasoning according to claim 1 wherein the pH is 7.6 to 9.3.

3. A texture improver for food material containing fibrous protein as a major component, comprising the seasoning according to claim 1.

4. A texture improver for food material containing fibrous protein as a major component, comprising the seasoning according to claim 2.

5. A drip inhibitor for food materials containing fibrous protein as a major component, comprising the seasoning according to claim 1.

6. A drip inhibitor for food materials containing fibrous protein as a major component, comprising the seasoning according to claim 2.

7. The seasoning according to claim 1 wherein the seasoning component is a sweet miso.

* * * * *

UNITED STATES PATENT AND TRADEMARK OFFICE
CERTIFICATE OF CORRECTION

PATENT NO. : 6,299,927 B1
DATED : October 9, 2001
INVENTOR(S) : Minoru Noda et al.

It is certified that error appears in the above-identified patent and that said Letters Patent is hereby corrected as shown below:

Column 2,
Line 26, "Examples 2 to 4" has been replaced with -- Examples 1 to 4 --.

Column 5,
Line 50, "mg 100 g" has been replaced with -- mg/100 g --.

Signed and Sealed this

Third Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,299,927 B1
DATED         : October 9, 2001
INVENTOR(S)   : Minoru Noda et al.

It is certified that error appears in the above-identified patent and that said Letters Patent is hereby corrected as shown below:

Column 8,
Lines 10 through 20, claims 3 through 6 have been deleted.

Signed and Sealed this

Fifth Day of August, 2003

JAMES E. ROGAN
*Director of the United States Patent and Trademark Office*